United States Patent
Tanimoto et al.

(10) Patent No.: US 7,484,228 B2
(45) Date of Patent: Jan. 27, 2009

(54) OPTICAL PICKUP FEEDING DEVICE

(75) Inventors: Katsuhiko Tanimoto, Saitama (JP);
Yusuke Akama, Saitama (JP); Takeshi Hamada, Saitama (JP)

(73) Assignee: Pioneer Corporation, Tokyo (JP)

( * ) Notice: Subject to any disclaimer, the term of this patent is extended or adjusted under 35 U.S.C. 154(b) by 127 days.

(21) Appl. No.: 10/592,753

(22) PCT Filed: Mar. 8, 2005

(86) PCT No.: PCT/JP2005/003974

§ 371 (c)(1),
(2), (4) Date: Sep. 14, 2006

(87) PCT Pub. No.: WO2005/093748

PCT Pub. Date: Oct. 6, 2005

(65) Prior Publication Data

US 2007/0199009 A1  Aug. 23, 2007

(30) Foreign Application Priority Data

Mar. 25, 2004  (JP)  .............................. 2004-089860

(51) Int. Cl.
*G11B 7/085* (2006.01)
(52) U.S. Cl. ..................................................... 720/676
(58) Field of Classification Search ................. 720/676, 720/663, 664, 665, 666, 667, 677, 679, 680; 360/267.6, 260; 403/59
See application file for complete search history.

(56) References Cited

U.S. PATENT DOCUMENTS

| 4,315,698 | A | * | 2/1982 | Takahashi et al. .............. 403/59 |
| 5,546,252 | A | * | 8/1996 | Hasegawa ................. 360/267.6 |
| 5,682,282 | A |   | 10/1997 | Kato |
| 5,913,941 | A | * | 6/1999 | Erikson et al. ............ 74/424.95 |
| 6,317,287 | B1 | * | 11/2001 | Yano et al. ..................... 360/260 |
| 6,499,712 | B1 | * | 12/2002 | Clark et al. ................... 248/429 |
| 7,210,153 | B2 | * | 4/2007 | Mori et al. .................... 720/677 |
| 2002/0144560 | A1 | * | 10/2002 | Yatsushiro et al. ............ 74/89.4 |
| 2006/0107277 | A1 | * | 5/2006 | Guo et al. ..................... 720/676 |

FOREIGN PATENT DOCUMENTS

| JP | 61-3568 U | 1/1986 |
| JP | 64-30923 A | 2/1989 |
| JP | 6-33935 A | 2/1994 |
| JP | 7-211018 A | 8/1995 |
| JP | 7-282550 A | 10/1995 |
| JP | 9-134575 A | 5/1997 |
| JP | 10-312652 A | 11/1998 |
| JP | 2000-195062 A | 7/2000 |
| JP | 2001-93161 A | 4/2001 |
| JP | 2002-279739 A | 9/2002 |
| JP | 2003-162872 A | 6/2003 |

* cited by examiner

*Primary Examiner*—Tianjie Chen
(74) *Attorney, Agent, or Firm*—Foley & Lardner LLP

(57) ABSTRACT

An optical-pickup feeding apparatus includes a pickup base on which an optical pickup is mounted, which includes a sliding bearing with a lubricant agent; and a lead screw that is slidably fitted into the sliding bearing. A peripheral surface of a screw thread of the lead screw is formed in a shape of a circular arc.

5 Claims, 5 Drawing Sheets

OPTICAL PICKUP FEEDING DEVICE

TECHNICAL FIELD

The present invention relates to an optical-pickup feeding apparatus provided in an optical disk player and an optical disk recorder for performing a reproduction or a recording operation with respect to an optical recording medium such as a CD and a DVD.

BACKGROUND ART

Conventionally, an optical-pickup feeding apparatus is configured in such a manner that a plate spring is fixed on a pickup base, a rack biased by the plate spring is engaged with a lead screw, the pickup base shifts by a rotation of the lead screw. The plate spring is structured with a plate spring A that consistently works when the lead screw rotates and with a plate spring B having an edge adjacent to a position for attaching the rack. The plate spring B does not work by a usual rotation but works for a displacement in a direction of releasing the rack from the lead screw when the rack is released from the lead screw and an engagement failure occurs. Therefore, an increase of a resistance in feeding the optical pickup and the engagement failure are prevented (see, for example, Patent Document 1).

Patent document 1: Japanese Patent Application Laid-Open No. 2002-279739

DISCLOSURE OF INVENTION

Problem to be Solved by the Invention

However, although the conventional optical-pickup feeding apparatus can suppress an increase of a resistance in conveying the optical pickup caused by a frictional force between the lead screw and the rack, there still is a problem that a countermeasure has not been taken against an increase of a resistance caused by a viscosity resistance of a lubricant agent between a shaft bearing arranged on the pickup base and the lead screw.

The above described is an example of a problem to be solved by the present invention and an object thereof is to provide an optical-pickup feeding apparatus that suppresses the increase of the resistance in feeding the optical pickup caused by the increase of the viscosity resistance of the lubricant agent between the shaft bearing arranged on the pickup base and the lead screw, in a low-temperature environment.

Means for Solving Problem

To solve the above problems and to achieve the object, an optical-pickup feeding apparatus according to one aspect of the present invention includes a pickup base on which an optical pickup is mounted, which includes a sliding bearing with a lubricant agent; and a lead screw that is slidably fitted into the sliding bearing. A peripheral surface of a screw thread of the lead screw is formed in a shape of a circular arc.

Effect of the Invention

The optical-pickup feeding apparatus according to the present invention is suitable for suppressing the increase of the resistance in feeding the optical pickup caused by the increase of the viscosity resistance of the lubricant agent between the shaft bearing arranged on the pickup base and the lead screw in a low-temperature environment and for working, even in the low-temperature environment, in the same way as in normal temperature.

EXPLANATIONS OF LETTERS OR NUMERALS

3 Carriage (pickup base)
3e, 73e Sliding bearing
9, 69 Lead screw

BEST MODE(S) FOR CARRYING OUT THE INVENTION

Exemplary embodiments of an optical-pickup feeding apparatus according to the present invention are explained below in detail with reference to the accompanying drawings. The present invention is not limited to the embodiments explained below.

First Embodiment

Figure 1:
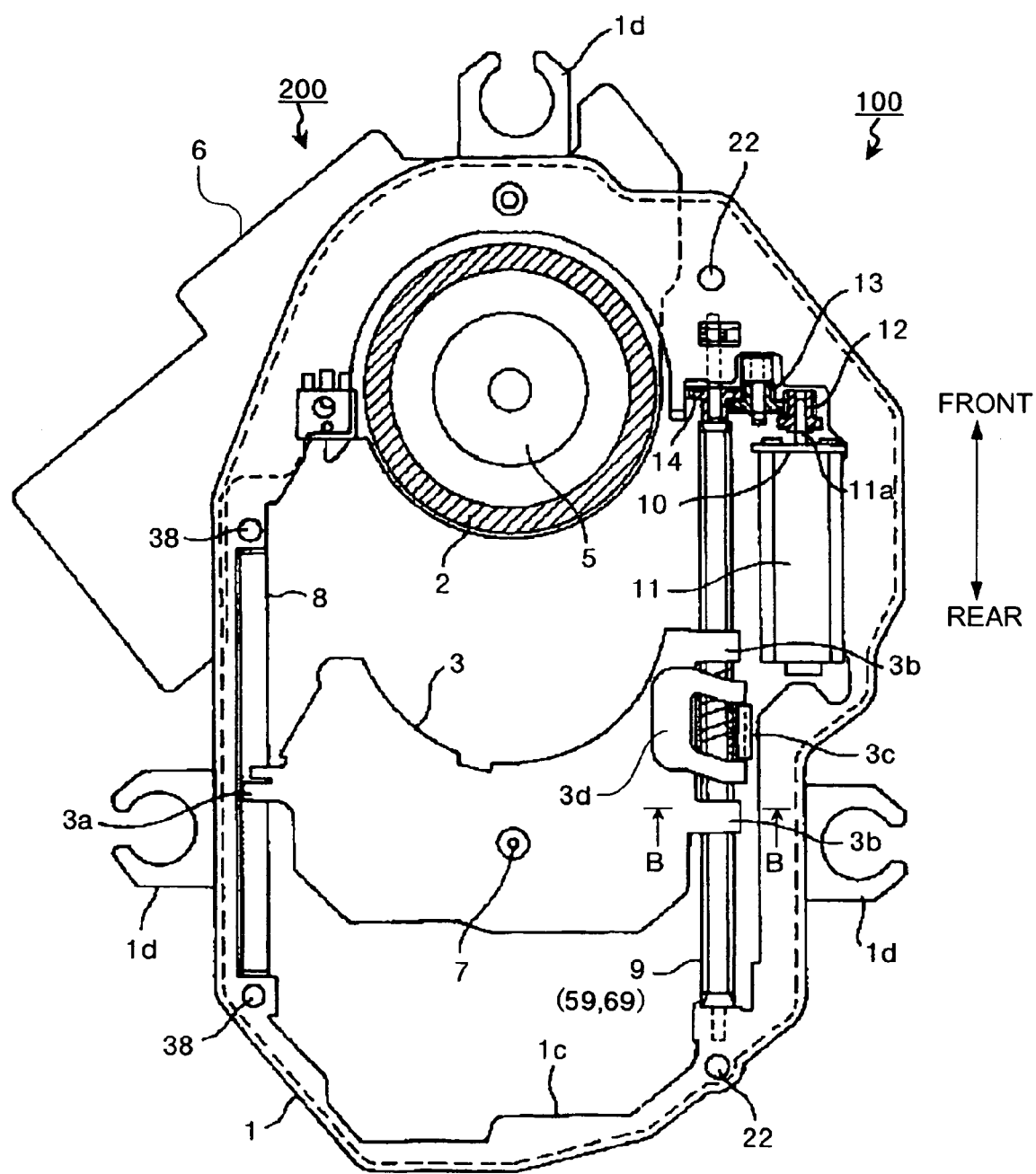
FIG. 1 is a top view of an optical-disk reproducing apparatus.
Figure 2:
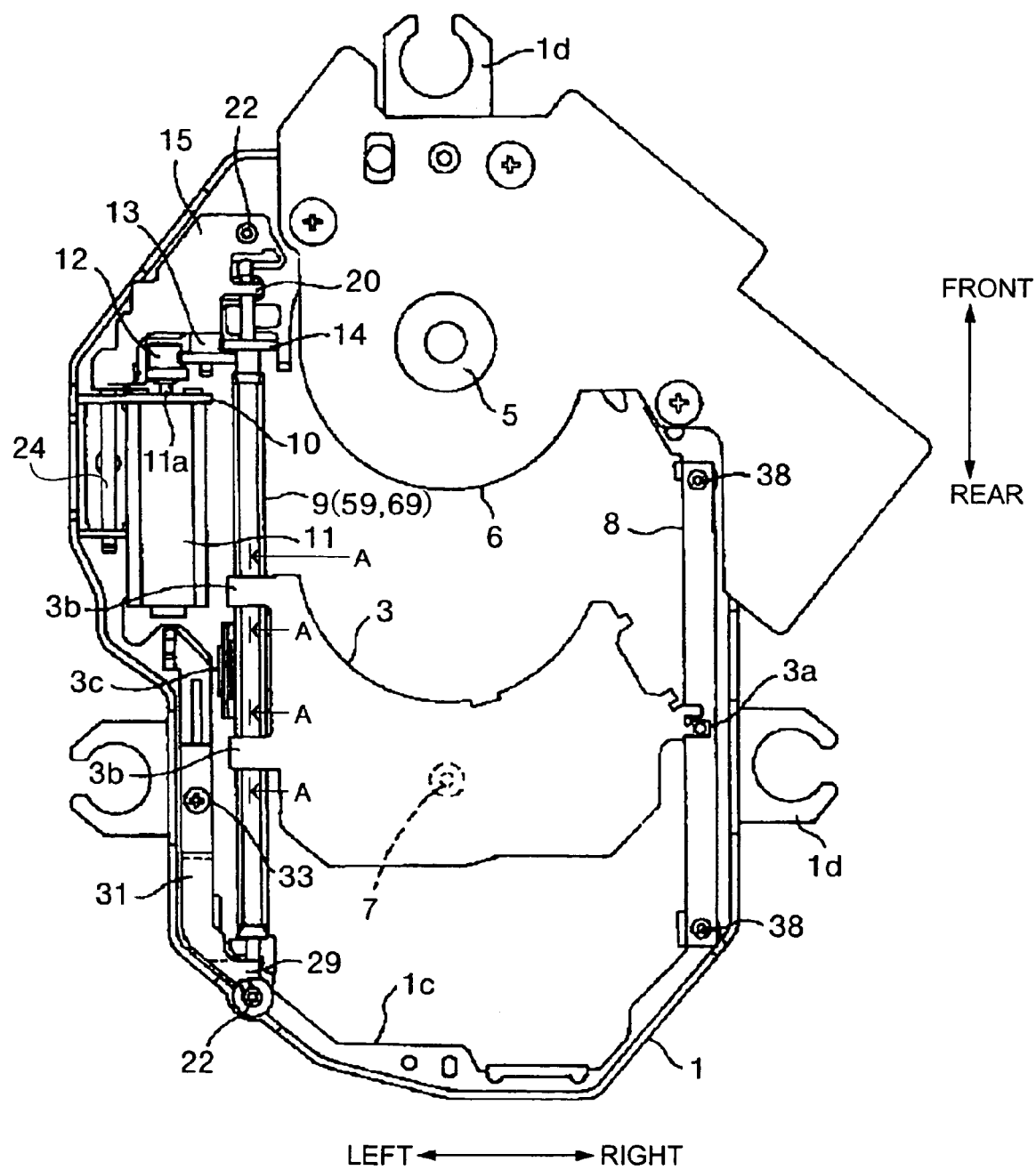
FIG. 2 is a bottom view of the optical-disk reproducing apparatus.

FIG. 1 is a top view of an optical-disk reproducing apparatus including the optical-pickup feeding apparatus according to the present invention. FIG. 2 is a bottom view of the optical-disk reproducing apparatus.

According to FIGS. 1 and 2, an optical-disk reproducing apparatus 200 includes a disk table 2 rotatably driven by a spindle motor 5 and an optical-pickup feeding apparatus 100, mounted on a chassis 1.

The chassis 1 is formed into a substantially rectangular shape by punching and press molding a metal plate and installed in a body of an optical disk player (not shown) with flanges 1d arranged on three portions of a periphery of the chassis 1. The spindle motor 5 is mounted on a support plate 6 and the support plate 6 is mounted on the chassis 1. The disk table 2 is held on one side of a center opening portion 1c of the chassis 1.

The optical-pickup feeding apparatus 100 includes an objective lens 7, a carriage 3, as a pickup base, that carries an optical pick up including an optical system such as a semiconductor laser and an objective-lens drive mechanism, a lead screw 9 that is rotatably driven by a carriage conveying motor 11, that supports one side of the carriage 3, and that is used as a main shaft for driving and conveying the carriage 3, and a sub shaft 8 that slidably supports the other side of the carriage 3.

The sub shaft 8 is a shaft having a round cross section and end portions of the sub shaft 8 are attached to a left periphery of the chassis 1 with skew screws 38, 38. With the skew screws 38, 38, height for attaching the sub shaft 8 to the chassis 1 can be adjusted for a skew adjustment.

One end portion of the lead screw 9 as the main shaft is rotatably supported by a shaft bearing 20 arranged on a skew adjustment member 15. The skew adjustment member 15 is rotatably supported by a bracket 10 mounted on the chassis 1, via a rotary shaft 24. With a skew screw 22 that engages the chassis 1 and the skew adjustment member 15, a height for attaching the lead screw 9 to the chassis 1 can be adjusted for the skew adjustment.

The other end portion of the lead screw 9 is rotatably supported by a shaft bearing 29 arranged on a skew adjustment member 31 made of resin. The skew adjustment member 31 is mounted on the chassis 1 with a locking screw 33. With the skew screw 22 that engages the chassis 1 and the skew adjustment member 31, the skew adjustment member 31 is bent, and the height for attaching the lead screw 9 to the chassis 1 can be adjusted for the skew adjustment.

The lead screw 9 is rotatably driven by the carriage conveying motor 11 mounted on the bracket 10. A driven gear 14 mounted on the lead screw 9 is engaged with a small gear of a two-tire middle gear 13 that engages with a drive gear 12 mounted on an output shaft 11a of the carriage conveying motor 11, and reduces a speed of a rotation of the carriage conveying motor 11.

Two arms 3b, 3b are arranged on a right side of the carriage 3. The lead screw 9 is inserted between the two arms 3b, 3b and a lubricant-agent-impregnated sliding bearing 3e, explained later, to be slidably fitted is attached to the two arms 3b, 3b. A rack 3c is attached between the two arms 3b, 3b. The rack 3c is pressed toward the lead screw 9 by a plate spring 3d fixed to the carriage 3 and is engaged with the lead screw 9 for conveying the carriage 3 forward and backward by a rotation of the lead screw 9 to shift the optical pickup to a target position.

A fork-shaped sub shaft bearing 3a is bulged from a left portion of the carriage 3 toward the sub shaft 8. The sub shaft bearing 3a sandwiches the sub shaft 8 so that the left portion of the carriage 3 becomes slidably supported by the sub shaft 8.

Figure 3:
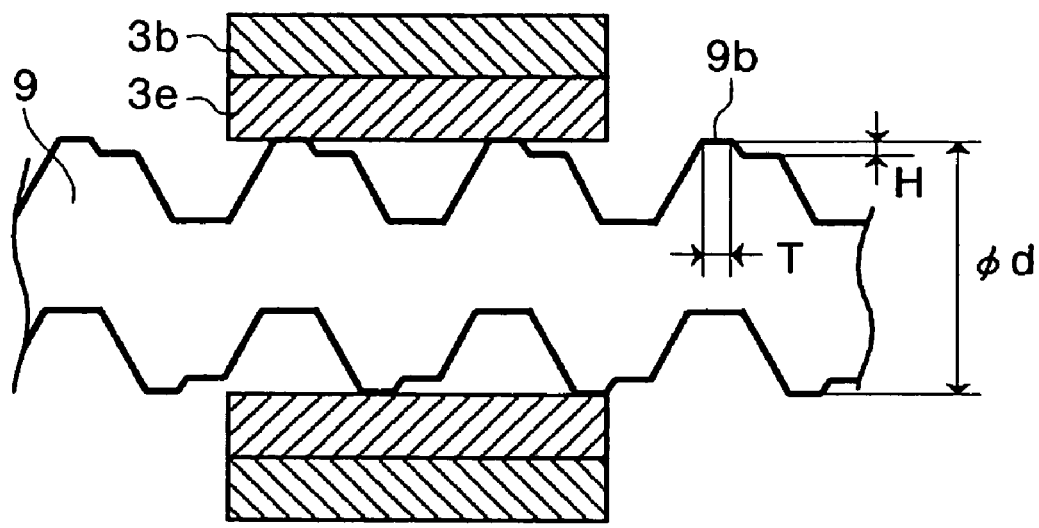
FIG. 3 is an enlarged cross section along a line A-A shown in FIG. 2 for explaining a first embodiment of the present invention.
Figure 4:
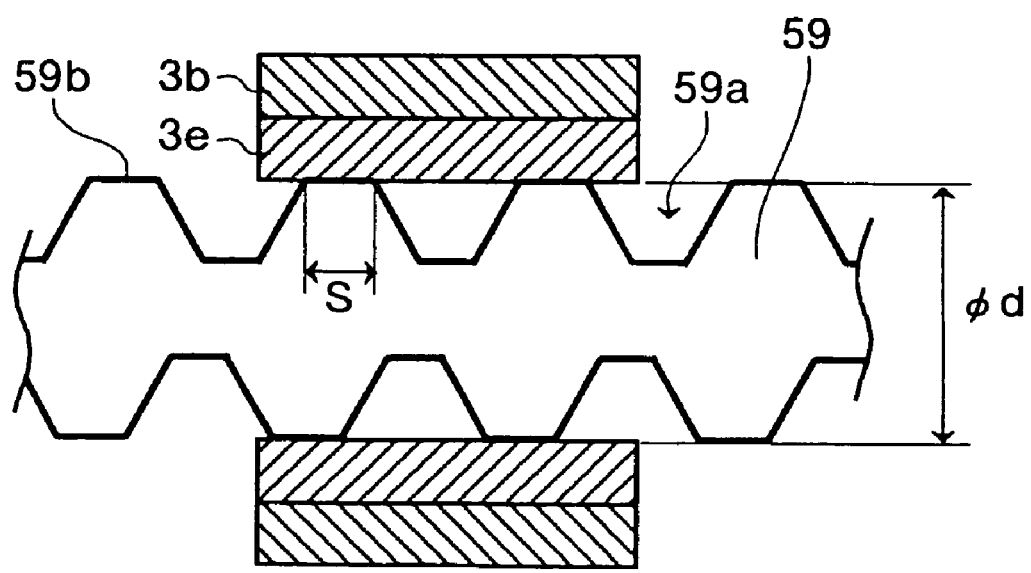
FIG. 4 is a schematic of a conventional optical-pickup feeding apparatus.

FIG. 3 is a schematic for explaining a structure of the lead screw 9 in the optical-pickup feeding apparatus 100 according to the first embodiment. FIG. 4 is a schematic of a lead screw 59 in a conventional optical-pickup feeding apparatus. As shown in FIG. 4, the lead screw 59 in the conventional optical-pickup feeding apparatus includes a spiral groove 59a formed on a shaft having a diameter $\phi d=3$ mm to 4 mm and a peripheral portion 59b, in a spiral band state, of a screw thread having a width S=2 mm to 3 mm, is slidably engaged with the lubricant-agent-impregnated sliding bearing 3e arranged on the arm 3b for bearing the main shaft of the carriage 3.

A clearance between the lubricant-agent-impregnated sliding bearing 3e and the peripheral portion 59b of the screw thread of the lead screw 59 is configured to be small in consideration of an occurrence of distortion, mechanical decentration, a backlash, and the like. Although the clearance is lubricated with a lubricant agent run out of the lubricant-agent-impregnated sliding bearing 3e, when in a low-temperature environment, a viscosity resistance of the lubricant agent becomes extremely high, causing a bad effect for a high-speed search of a disk.

As a measure for lowering the viscosity resistance in a low-temperature environment, if a viscosity of the lubricant agent is lowered, the lubricant agent gets spattered due to a high-speed rotation of the lead screw 59. Therefore, the viscosity of the lubricant agent cannot be lowered. Further, it can be considered to make the clearance bigger between the lubricant-agent-impregnated sliding bearing 3e and the peripheral portion 59b of the screw thread of the lead screw 59; however, it can hardly be adopted because of a larger distortion, mechanical decentration, and backlash it will cause.

FIG. 3 is a schematic of an example of a suppression mechanism that suppresses the viscosity resistance of the lubricant agent. The suppression mechanism according to the present invention is a mechanism for reducing a size of a contact area between the lubricant-agent-impregnated sliding bearing 3e and the lead screw 9 to, for example, suppress an increase of a torque constant of a viscosity resistance load of the lubricant agent in a low-temperature environment. It is enough to form the suppression mechanism on at least one of the lubricant-agent-impregnated sliding bearing 3e and the lead screw 9.

According to the optical-pickup feeding apparatus 100 shown in the first embodiment, the suppression mechanism is formed on the lead screw 9. More specifically, a peripheral portion 9b of the lead screw 9 having a diameter $\phi d$ is made on a left side with a substantial width of "T" and the other portion of the lead screw 9 is notched in a layer so that a clearance H is formed between the lubricant-agent-impregnated sliding bearing 3e and the lead screw 9. Because the width "T" of the peripheral portion 9b is narrow, referring to a cross section shown in FIG. 3, the lubricant-agent-impregnated sliding bearing 3e and the lead screw 9 are substantially in a point-contact state. A point-contact area is spirally continued in a circumferential direction, so that the lubricant-agent-impregnated sliding bearing 3e and the lead screw 9 linearly come into contact. According to the optical-pickup feeding apparatus 100 of the first embodiment, the size of the contact area between the lubricant-agent-impregnated sliding bearing 3e and the lead screw 9 is reduced to a linear state and the increase of the torque constant of the viscosity resistance load of the lubricant agent in a low-temperature environment can be suppressed.

Figure 5:
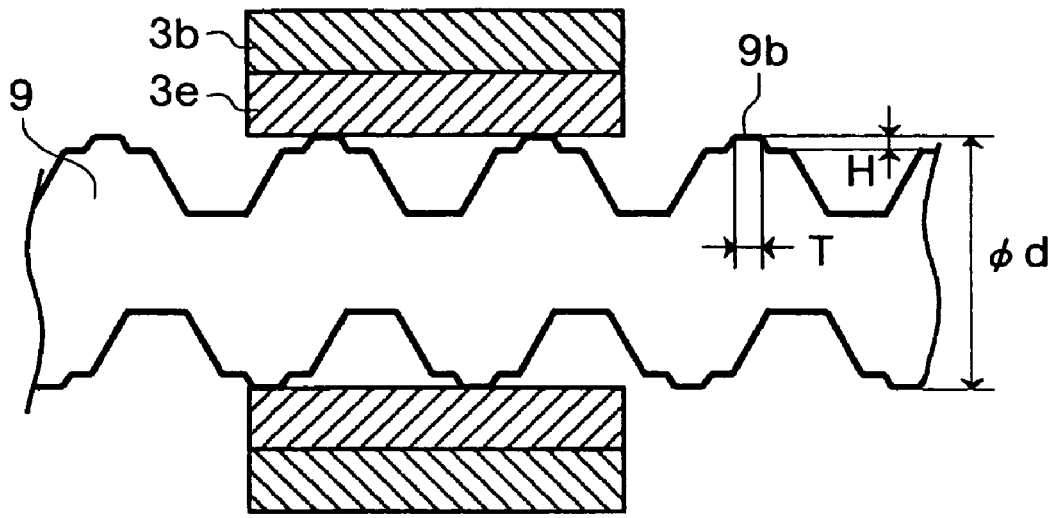
FIG. 5 is a schematic of a modification of an optical-pickup feeding apparatus according to the first embodiment.

FIG. 5 is a schematic of a modification of the optical-pickup feeding apparatus 100 according to the first embodiment. The peripheral portion 9b of the lead screw 9 having a diameter $\phi d$ is made not on the left side but on a center area of the lead screw 9, which is a different point in a configuration from that shown in FIG. 3. Other sizes in the configuration are the same. An area for making the peripheral portion 9b can be on the left side, on a right side, or on the center area along an axial direction.

Second Embodiment

Figure 6:
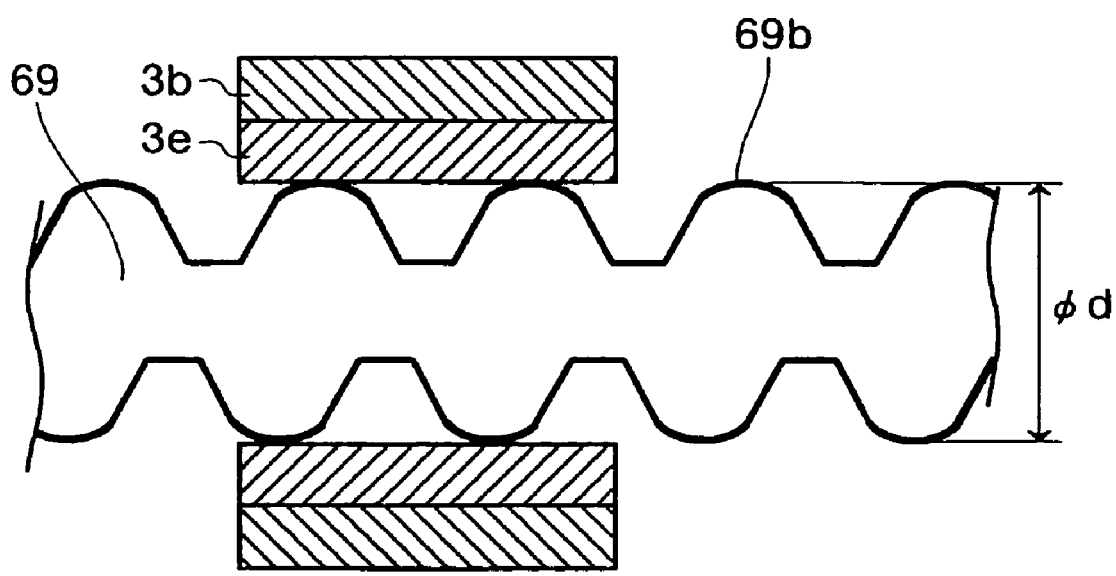
FIG. 6 is an enlarged cross section along the line A-A shown in FIG. 2 for explaining a second embodiment of the present invention.

Next, a structure of the optical-pickup feeding apparatus 100 according to a second embodiment is explained with reference to FIG. 6. FIG. 6 is an enlarged cross section along the line A-A shown in FIG. 2 for explaining the optical-pickup feeding apparatus 100 of the second embodiment. According to the optical-pickup feeding apparatus 100 of the second embodiment, a peripheral portion 69b of a thread of a lead screw 69 having a diameter $\phi d$ is formed so that a longitudinal sectional view of the peripheral portion 69b becomes a circular arc. Other configurations are the same as those of the first embodiment.

In view of the cross section shown in FIG. 6, the lubricant-agent-impregnated sliding bearing 3e and the lead screw 69 are substantially in a point-contact state and a point-contact area is spirally continued in a circumferential direction, resulting in making a linear contact between the lubricant-agent-impregnated sliding bearing 3e and the lead screw 69. According to the optical-pickup feeding apparatus 100 of the second embodiment, a size of a contact area between the lubricant-agent-impregnated sliding bearing 3e and the lead screw 69 is reduced to a linear state and an increase of the torque constant of the viscosity resistance load of the lubricant agent in a low-temperature environment is suppressed. Accordingly, even with the second embodiment, an increase of a resistance in conveying the optical pickup caused by the increase of the viscosity resistance of the lubricant agent in a low-temperature environment can be suppressed.

Figure 7:
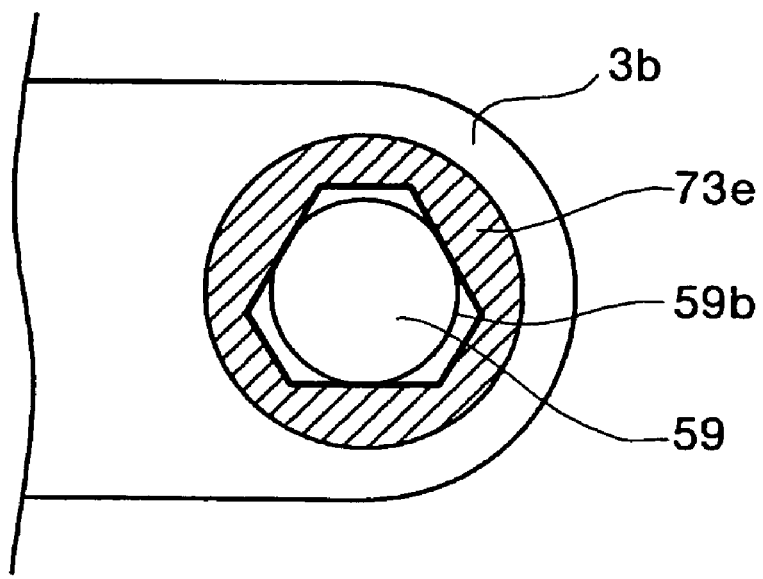
FIG. 7 is an enlarged cross section along a line B-B shown in FIG. 1 for explaining a third embodiment of the present invention.

Next, a structure of the optical-pickup feeding apparatus 100 according to a third embodiment is explained with reference to FIG. 7. FIG. 7 is an enlarged cross section along a line B-B shown in FIG. 1 for explaining the optical-pickup feeding apparatus 100 of the third embodiment. According to the optical-pickup feeding apparatus 100 of the third embodiment, a configuration of a lead screw is the same as that of the conventional lead screw 59 shown in FIG. 4. A lubricant-agent-impregnated sliding bearing 73e is formed into a hexagon that circumscribes the peripheral portion 59b of the lead screw 59, at three points in a circumferential direction, in a linear state along an axial direction. A shape of a cross section of the lubricant-agent-impregnated sliding bearing 73e can be not only the hexagon but also other polygons with more than three sides.

According to the optical-pickup feeding apparatus 100 of the third embodiment, a size of a contact area between the lubricant-agent-impregnated sliding bearing 73e and the lead screw 59 is reduced in linear state and an increase of the torque constant of the viscosity resistance load of the lubricant agent in a low-temperature environment is suppressed.

Figure 8:
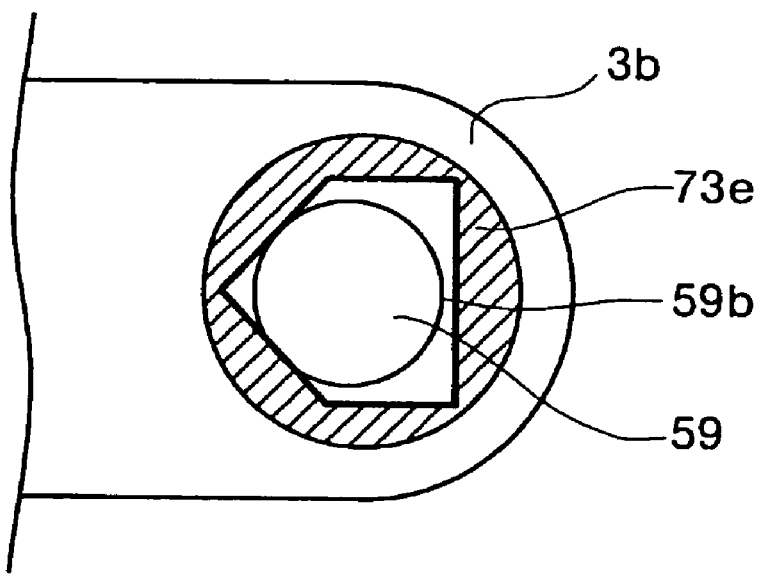
FIG. 8 is a schematic of a modification of an optical-pickup feeding apparatus according to the third embodiment.

FIG. 8 is a schematic of a modification of the optical-pickup feeding apparatus 100 according to the third embodiment. The lubricant-agent-impregnated sliding bearing 73e is formed into a pentagon that circumscribes the peripheral portion 59b of the lead screw 59, at two points in a circumferential direction, in a linear state along an axial direction. As explained, contact points can be two. A shape of the cross section of the lubricant-agent-impregnated sliding bearing 73e can be not only the pentagon but also other polygons with more than three sides.

Although the embodiments according to the present invention are explained above, the lubricant-agent-impregnated sliding bearings 3e and 73e can not only be the lubricant-agent-impregnated sliding bearings but also be a slide shaft, on which the lubricant agent is spread. Further, the suppression mechanism for (formed on) the lead screws explained in the first and the second embodiments and the suppression mechanism for the lubricant-agent-impregnated sliding bearings explained in the third embodiment can be combined. It is needles to say that an optical-disk reproducing apparatus and an optical-disk recording apparatus that incorporate the optical-pickup feeding apparatus shown in the embodiments according to the present invention can be effective with the optical-pickup feeding apparatus.

INDUSTRIAL APPLICABILITY

As described above, the optical-pickup feeding apparatus according to the present invention is suitable as the optical-pickup feeding apparatus for an optical disk player and an optical disk recorder for performing a reproduction and a recording with respect to an optical recording medium such as a CD and a DVD, and particularly, is suitable for an apparatus used outside.

The invention claimed is:

1. An optical-pickup feeding apparatus comprising:
    a pickup base on which an optical pickup is mounted, the pickup base including a sliding bearing with a lubricant agent; and
    a lead screw that is slidably fitted into the sliding bearing,
    wherein the lead screw comprises a screw thread with a peripheral surface contacting the sliding bearing and running along a longitudinal direction of the screw thread, and
    wherein the peripheral surface of the screw thread is formed in a shape of a circular arc.

2. The optical-pickup feeding apparatus according to claim 1, wherein the circular arc of the screw thread of the lead screw has an apex portion,
    wherein clearance between the sliding bearing and the peripheral surface of the screw thread of the lead screw is configured to be minimum at the apex portion, and
    wherein the clearance is configured to gradually increase in accordance with distance from the apex portion.

3. The optical-pickup feeding apparatus according to claim 1, wherein the circular arc has an apex portion,
    wherein clearance between the sliding bearing and the peripheral surface of the screw thread of the lead screw is configured to be minimum at the apex portion, and
    wherein the clearance is configured to gradually increase in directions on either side of the apex portion along the longitudinal direction of the screw thread.

4. The optical-pickup feeding apparatus according to claim 1, wherein the sliding bearing and the lead screw are substantially in a point-contact state such that a point-contact area is spirally continued in a circumferential direction about the lead screw.

5. The optical-pickup feeding apparatus according to claim 1, wherein the sliding bearing and the lead screw are substantially in a point-contact state such that a linear contact path between the sliding bearing and the lead screw is formed.

* * * * *